(12) United States Patent
Kishi et al.

(10) Patent No.: US 8,105,433 B2
(45) Date of Patent: Jan. 31, 2012

(54) CEMENT ADMIXTURE, AND CEMENT COMPOSITION AND CONCRETE CONTAINING THE CEMENT ADMIXTURE

(75) Inventors: Toshiharu Kishi, Tokyo (JP); Tae-Ho Ahn, Tokyo (JP); Akira Hosoda, Yokohama (JP); Kaoru Kobayashi, Tokyo (JP)

(73) Assignees: The University of Tokyo, Tokyo (JP); National University Corporation Yokohama National University, Kanagawa (JP); East Japan Railway Company, Tokyo (JP)

( * ) Notice: Subject to any disclaimer, the term of this patent is extended or adjusted under 35 U.S.C. 154(b) by 0 days.

(21) Appl. No.: 12/867,603

(22) PCT Filed: Feb. 13, 2009

(86) PCT No.: PCT/JP2009/052421
§ 371 (c)(1),
(2), (4) Date: Oct. 14, 2010

(87) PCT Pub. No.: WO2009/102025
PCT Pub. Date: Aug. 20, 2009

(65) Prior Publication Data
US 2011/0132231 A1    Jun. 9, 2011

(30) Foreign Application Priority Data
Feb. 14, 2008 (JP) .............. P2008-033548

(51) Int. Cl.
C04B 14/00 (2006.01)
C04B 12/02 (2006.01)
C04B 14/04 (2006.01)
C04B 14/10 (2006.01)
C04B 22/00 (2006.01)
C04B 22/06 (2006.01)
C04B 22/08 (2006.01)
C04B 22/10 (2006.01)
C04B 28/02 (2006.01)
C04B 103/60 (2006.01)
C04B 111/20 (2006.01)

(52) U.S. Cl. ........ 106/691; 106/672; 106/690; 106/681; 106/692; 106/694; 106/695; 106/715; 106/716; 106/718; 106/773; 106/782; 106/792; 106/793; 106/800; 106/801; 106/811; 106/819; 106/DIG. 4

(58) Field of Classification Search .......... 106/690, 106/691, 692, 694, 695, 718, 773, 801, 811, 106/672, 680, 681, 715, 716, 782, 792, 793, 106/800, 819, DIG. 4
See application file for complete search history.

(56) References Cited

U.S. PATENT DOCUMENTS

2005/0247238 A1* 11/2005 Brothers et al. ............. 106/814
2006/0230984 A1* 10/2006 Bredt et al. .................. 106/690

FOREIGN PATENT DOCUMENTS

| JP | 2521274 B2 | 5/1996 |
| JP | 2000-272943 A | 10/2000 |
| JP | 2000-280223 A | 10/2000 |
| JP | 2004-292201 A | 10/2004 |
| JP | 2005-35836 A | 2/2005 |
| JP | 3658568 B2 | 3/2005 |
| JP | 2005-239482 A | 9/2005 |
| JP | 2006-219320 A | 8/2006 |
| JP | 2006-248887 A | 9/2006 |
| WO | WO 01/30721 A1 * | 3/2001 |

OTHER PUBLICATIONS

Derwent-Acc-No. 1992-316613, abstract of Chinese Patent Specification No. CN 1057825A (Jan. 1992).*
Derwent-Acc-No. 2000-628759, abstract of Chinese Patent Specification No. CN 1262293 (Aug. 2000).*
Derwent-Acc-No. 2006-705331, abstract of Korean Patent Specification No. KR 2006-027960A (Mar. 2006).*
Derwent-Acc-No. 2008-G07003, abstract of Chinese Patent Specification No. CN 101139229A (Mar. 2008).*
International Search Report for International Application No. PCT/JP2009/052421 dated Mar. 10, 2009.
International Preliminary Report on Patentability for International Application No. PCT/JP2009/052421 having an issuance date of Oct. 5, 2010 and a mailing date of Oct. 14, 2010.

* cited by examiner

*Primary Examiner* — Anthony Green
(74) *Attorney, Agent, or Firm* — Sughrue Mion, PLLC

(57) ABSTRACT

It is an object of the invention to provide a cement admixture that can form concrete having a sufficient self-healing capability and satisfactorily maintaining its self-healing capability for prolonged periods. The cement admixture of the invention contains an expanding material and an alumina-silicate with swelling properties. The cement admixture is combined with cement to form a cement composition. The cement composition is mixed with water and an aggregate to provide concrete with an excellent self-healing capability.

6 Claims, No Drawings

CEMENT ADMIXTURE, AND CEMENT COMPOSITION AND CONCRETE CONTAINING THE CEMENT ADMIXTURE

TECHNICAL FIELD

The present invention relates to a cement admixture, and to a cement composition and concrete containing the cement admixture.

BACKGROUND ART

Concrete used for building of structures comprises cement, water, aggregates and the like, and is of such a nature that it hardens by hydration reaction. Hardened concrete is susceptible to cracking due to the action of stress, and to volume changes caused by temperature variations, drying, or the like. When cracking is produced, water readily infiltrates the concrete, resulting in water leakage and other problems while also leading to reduced structural durability and impaired aesthetic quality. Water leakage due to cracking is also a problem with underground structures, for example, in which cases cost is amplified because of the difficulty of repair operations for the cracking. Conventional measures have included reparation by injection of fillers after cracking has formed, or waterproofing or water-blocking the concrete so that the structures are not affected even when cracking has formed.

Measures such as reparation, waterproofing and water-blocking, however, necessarily increase cost and potentially lengthen the construction period for structure building, and are therefore preferably avoided when possible. This has led to development of "self-healing concrete" that can undergo auto-repair even when cracking has been formed (see Patent documents 1 and 2, for example). Such concrete has a property allowing it to repair its own cracking, and can maintain water-blocking performance and durability even without the reparations or waterproofing and water-blocking treatment described above.

[Patent document 1] Japanese Patent Publication No. 3658568
[Patent document 2] Japanese Unexamined Patent Application Publication No. 2005-239482

SUMMARY OF INVENTION

Problems to be Solved by the Invention

In recent years, further improvement in post-cracking water-blocking performance is being demanded of such self-healing concrete. For use in structures, it must exhibit a sufficient self-healing capability after formation of cracking, not only during the brief period after placement but also after elapse of extended periods.

The present invention has been accomplished with the aim of meeting these demands, and it is an object thereof to provide a cement admixture that can form concrete having a sufficient self-healing capability and satisfactorily maintaining its self-healing capability for prolonged periods. It is another object of the invention to provide a cement composition comprising the cement admixture, and concrete employing the cement composition.

Means for Solving the Problems

In order to achieve the objects stated above, the cement admixture of the invention comprises an expanding material and an alumina-silicate with swelling properties.

When the cement admixture of the invention is added to a cement composition for use as concrete, it imparts an excellent self-healing capability to the concrete and the self-healing capability can be maintained for prolonged periods. While the causative factors are not fully understood, the following is offered as conjecture.

That is, the expanding material in the cement admixture of the invention generates hydrates with expanding properties, by hydration with water at the cracking sites that have formed in concrete, and the cracking sites can be filled by expansion of these hydrates. In addition, the alumina-silicate in the cement admixture, which has swelling properties, generates crystalline hydrates by hydration with water and swells, combining with the expanding material hydrates to form insoluble precipitates. When water infiltrates into the cracking sites of concrete containing these components, first the alumina-silicate with swelling properties undergoes immediate swelling and fills the voids in the concrete, reducing the gaps in which hydrates can be deposited in the concrete. Following this, it is believed that the components that have eluted from the expanding material migrate into the cracking sites by diffusion, without being deposited in the concrete, to provide an excellent effect of selective filling of the cracking sites. As a result, even when cracking has formed in concrete employing a cement composition containing the cement admixture of the invention, the cracking is sufficiently repaired by the action of both the expanding material and the alumina-silicate with swelling properties, and the water-blocking performance is satisfactory maintained.

The alumina-silicate with swelling properties included in the cement admixture absorbs moisture during the initial stage of hardening of the concrete. Therefore, as the cement composition contains the alumina-silicate, once it has been used in concrete and hardened, it is possible to inhibit hydration of the expanding material and to leave the unreacted expanding material. Since the hardened concrete thus contains more unreacted expanding material than in the prior art, it can satisfactorily maintain its self-healing capability based on the mechanism described above for prolonged periods, thus allowing rapid reparation of cracking that has formed after elapse of long periods of time. However, the effects of the invention are not limited to these.

The cement admixture of the invention preferably further contains a magnesium silicate. Concrete employing a cement composition containing alumina-silicate having such swelling properties often has a lower flow property because of rapid moisture absorption, but if the cement composition includes magnesium silicate it is possible to appropriately increase the flow property of the concrete and facilitate concrete placement. Magnesium silicate can also increase the stability of hydrates formed from the alumina-silicate with swelling properties, thus increasing the chemical stability of precipitates that fill sites of cracking and further improving the self-repair property.

The cement admixture preferably also contains calcium phosphate. Calcium phosphate reacts with components in the cement hydrate to produce hydrates with high bonding strength, and can consolidate the cement hydrate structure. By including calcium phosphate, therefore, it is possible to form such dense hydrates at cracking sites that have formed in the concrete, and to further improve the water-blocking performance of the concrete after self-healing.

The cement admixture also even more preferably further contains a compound with a carbonic acid group, and calcium oxide. These components in the cement admixture can react together to form carbonate compounds with low solubility in water, when water is present after cracking has formed in the concrete. Thus, a cement admixture containing a compound with carbonic acid groups and calcium oxide will exhibit better reparation of cracking sites in the concrete and will have greater self-healing performance.

The cement admixture preferably also further contains a water reducing agent. By including a water reducing agent, it is possible to delay hydration of the expanding material in the cement when the concrete is hardened, thus allow the self-healing performance of the concrete to be maintained for longer periods.

The invention further provides a cement composition containing cement and the cement admixture of the invention. The invention still further provides concrete containing the cement composition of the invention, water and an aggregate. Since concrete containing the cement composition of the invention contains the cement admixture of the invention, it can exhibit the excellent self-healing capability when used as concrete, as explained above, while also exhibiting a satisfactory self-healing capability even after an extended period has elapsed after hardening of the concrete.

Effect of the Invention

According to the invention it is possible to provide a cement admixture that can impart an excellent self-healing capability to concrete and that can satisfactorily maintain the self-healing capability for prolonged periods. It is also possible to provide a cement composition containing the cement admixture, that has a high self-healing capability and can satisfactorily maintain the self-healing capability for a long time, as well as concrete containing it.

BEST MODE FOR CARRYING OUT THE INVENTION

Preferred modes of the invention will now be explained.

A preferred embodiment of the cement admixture will be explained first. The cement admixture of this embodiment contains an expanding material and an alumina-silicate with swelling properties. The expanding material is a component with a nature such that it expands upon contact with water, and such an expanding material is preferably one that expands by formation of crystals upon hydration. This includes, for example, cement-based expanding materials that produce ettringite or calcium hydroxide by hydration. Examples of expanding materials include CSA (calcium sulfoaluminate), CaO and $CaSO_4$. The cement composition may contain a single type of expanding material or a combination of a plurality of types. The expanding material is preferably included at 4-6 wt % in the cement composition that contains the cement and cement admixture.

The alumina-silicate with swelling properties is alumina-silicate having properties such that it swells by absorption of moisture, and bentonite may be mentioned as an example. Bentonite with cations such as $Na^+$, $Ca^+$, $Mg^+$ and $K^+$ may be used without restrictions. Particularly preferred is $Na^+$-type bentonite (Na-bentonite) which has excellent swelling properties and can inhibit formation of cracking in concrete, while also satisfactorily imparting an ability to maintain the self-healing capability.

A suitable embodiment of the cement admixture preferably contains other components in combination with the expanding material and the alumina-silicate with swelling properties. Magnesium silicate may be mentioned first as such a component. Magnesium silicate allows the flow property of the concrete to be sufficiently maintained even when moisture has been absorbed by addition of the alumina-silicate with swelling properties, such as bentonite, during preparation of the concrete. Addition of magnesium silicate therefore results in good manageability of the concrete. Magnesium silicate can also increase the stability of hydrates formed from the alumina-silicate with swelling properties, thus increasing the chemical stability of precipitates that fill sites of cracking, and further improving the self-repair property.

The cement admixture may also contain magnesium compounds other than magnesium silicate. In particular, magnesite ($MgCO_3$) and dolomite ($CaMg(CO_3)_2$) are preferred because they can form Mg—Si based hydrates or $CaCO_3$ hydrate, which have high stability in cracking sites in concrete, and contribute to an improved self-repair property. Talc is especially useful as a component to be included in the cement admixture, because it usually includes combinations of the aforementioned preferred components comprising magnesium or carbonic acid groups, in addition to magnesium silicate.

Calcium phosphate is preferred as one of the other components to be added to the cement admixture. There are no particular restrictions on the form of the calcium phosphate, and it may be appropriately selected from among monobasic calcium phosphate ($Ca(H_2PO_4)_2$), dibasic calcium phosphate ($CaHPO_4$), tribasic calcium phosphate ($Ca_3(PO_4)_2$) and the like. Calcium phosphate is preferably included in the cement composition at 0.3-1 wt %.

Of these, dibasic calcium phosphate, in concrete containing the cement composition, can form dense hydrates in cracking sites by reacting with calcium hydroxide formed in cement hydrate to produce hydroxyapatites (such as $Ca_{10}(PO_2)_6(OH)_2$) having high bonding strength. Thus, dibasic calcium phosphate is particularly preferred because it can impart a high self-repair property to concrete.

The other component is more preferably added in the form of a combination of a compound with a carbonic acid group, and calcium oxide. First, compounds with carbonic acid groups are preferably metal carbonates, and examples thereof include $Li_2CO_3$ (lithium carbonate), $Na_2CO_3$ (sodium carbonate), $K_2CO_3$ (potassium carbonate), $MgCO_3$ (magnesium carbonate), $LiHCO_3$ (lithium hydrogencarbonate), $NaHCO_3$ (sodium hydrogencarbonate), $KHCO_3$ (potassium hydrogencarbonate) and $Mg(HCO_3)_2$ (magnesium hydrogencarbonate). Salts with carbonic acid groups are preferred among these, with $NaHCO_3$ (sodium bicarbonate) being especially preferred because it is inexpensive and readily available, and has an excellent property of repairing cracking in concrete. The compound with a carbonic acid group is preferably included at no greater than 10 wt %, and more preferably included in a range of 0.01-3 wt %, in the cement composition.

Calcium oxide (CaO), on the other hand, produces $Ca(OH)_2$ by reaction with water, which is a volume-expanding reaction, and therefore functions as the aforementioned expanding material. Therefore, when the admixture contains CaO as the expanding material, the CaO content may be such as to allow it to function as both the expanding material and an additive. By including a combination of CaO and a compound with a carbonic acid group, the reaction between the components can form reaction products with high stability, such as $CaCO_3$, when cracking has formed in the concrete, thus resulting in an even more excellent self-healing capability.

The cement admixture preferably further contains a water reducing agent. The water reducing agent may be a known water reducing agent known as a water reducing agent for use in concrete, such as a water reducing agent, an AE water reducing agent, high performance water reducing agent or high performance AE water reducing agent, without restrictions. Of these, polycarboxylic acid-based water reducing agents can inhibit reduction in the flow property of the concrete that occurs when the alumina-silicate with swelling properties is added, and are preferred from the viewpoint of satisfactorily maintaining the flow property and improving manageability. The water reducing agent is preferably included in the cement composition at 0.8-3.0 wt %. Instead of including the water reducing agent in the cement admixture, it may be added when the cement composition is used to prepare concrete, as described below.

The cement admixture may further contain, in addition to the components mentioned above, an inorganic cement crystal growth promoter that promotes production of cement crystals. Examples of inorganic cement crystal growth promoters include those having compositions comprising Portland cement compositions, and superfine silica, water glass, magnesium silicofluoride or magnesia and water-soluble silicofluorides comprising at least one silica-containing silicofluoride compound (see Japanese Patent No. 2521274). Such cement crystal growth promoters can infiltrate into cracking sites that have formed in concrete, thus causing crystal formation at those sites. By further including such a cement crystal growth promoter, therefore, it is possible to further improve the self-repair property of the concrete.

A preferred embodiment of a cement composition contains cement and the cement admixture of the invention described above. Portland cement or other mixed cements may be used as the cement, without any particular restrictions. Examples of Portland cement include low-heat Portland cement, normal Portland cement, high-early-strength Portland cement, ultra-high-early-strength Portland cement, moderate heat Portland cement, sulfate-resisting Portland cement and the like. Examples of mixed cements include blast furnace cement, silica cement and fly ash cement. The cement is preferably Portland cement, with normal Portland cement, moderate heat Portland cement or low-heat Portland cement being preferred. The cement composition preferably comprises 80-95 wt % cement in combination with the cement admixture as the additional component.

A preferred embodiment of concrete will now be described.

The concrete of this embodiment comprises a cement composition containing the cement admixture of the invention described above, with water and an aggregate. The aggregate used in the concrete may be a coarse aggregate or fine aggregate. A cement composition to which both a coarse aggregate and a fine aggregate have been added as aggregates is usually referred to as concrete while a composition containing only a fine aggregate is usually referred to as mortar, but the concrete of the invention contains both. Coarse aggregates include river gravel, sea gravel, mountain gravel, crushed stone, slag detritus and the like, and fine aggregates include river sand, sea sand, mountain sand and the like. Coarse aggregates and fine aggregates can be separated by ordinary classification (screening or the like).

The amount of water in such concrete is preferably 25-60 wt % and more preferably 40-50 wt %, based on 100 wt % as the cement composition. If the amount of water exceeds 60 wt %, a large amount of water will remain in the concrete after hardening and the strength may be insufficient, while excessive hydration of the expanding material in the cement admixture may make it difficult to maintain a self-healing capability for prolonged periods. An amount of water of less than 25 wt % will not constitute any particular hindrance to hardening of the concrete or its properties after hardening, but it may result in difficult mixing of the concrete during operation, if a high performance water reducing agent (mixing agent) is not used. The amount of water may be below 25 wt % when forming, for example, high strength concrete or high-flow concrete.

The content of the cement composition in the concrete, for example, for a composition classified as ordinary mortar as mentioned above, is preferably 300-1000 kg and more preferably 400-800 kg per 1 $m^3$. For a composition classified as ordinary concrete, it is preferably 200-700 kg and more preferably 300-450 kg per 1 $m^3$ of concrete. If the cement composition content is within these ranges, hardening of the concrete by the cement composition will take place satisfactorily and excellent strength will be exhibited, while unreacted expanding material will be appropriately left in the concrete to obtain an excellent self-healing capability to allow the self-healing capability to be maintained for prolonged periods.

From the viewpoint of obtaining sufficient strength for such concrete, the content of the fine aggregate in the concrete, for example, for a composition classified as ordinary mortar, is preferably 1000-1700 kg and more preferably 1200-1500 kg per 1 $m^3$. For a composition classified as ordinary concrete, it is preferably 700-1000 kg and more preferably 800-900 kg per 1 $m^3$ of concrete, and the content of the coarse aggregate is preferably 800-1100 kg and more preferably 850-950 kg per 1 $m^3$ of concrete.

Such concrete can be obtained, for example, by adding the cement admixture to cement to form a cement composition, and adding water or an aggregate thereto and mixing. However, since it is sufficient for the concrete of the invention to contain the cement admixture in the composition, some of the components in the cement admixture may be added during preparation of the concrete, for example, instead of being included in the cement composition.

With concrete employing a cement composition containing a cement admixture of the invention having the construction described above, first the presence of the expanding material and the alumina-silicate with swelling properties in the cement admixture lead to formation of precipitates by hydration of these components, so that cracking sites are repaired when cracking forms in the hardened concrete. In addition, since the cement admixture contains an alumina-silicate with swelling properties, hydration of the expanding material and other components during hardening of the concrete is inhibited, and the hardened concrete retains large amounts of residue of the unreacted expanding material and other components. Such concrete therefore has a satisfactory self-healing capability after hardening, and can satisfactorily maintain its self-healing capability for prolonged periods.

In particular, a cement admixture further containing a combination of magnesium silicate, calcium phosphate, a compound with carbonic acid groups and calcium oxide, or additionally other components such as a water reducing agent, the self-healing capability described above is further improved and the self-healing capability can be maintained longer, thus resulting in a more satisfactory effect of the invention.

Consequently, the concrete of the invention containing such a cement admixture has an excellent property of self-recovery of its water-blocking performance even when cracking has formed after hardening, and can maintain this property for a long period, making it highly suitable for structures that are prone to formation of water leaks or that are difficult to repair, such as underground structures and tunnels.

EXAMPLES

The present invention will now be explained in greater detail through the following examples, with the understanding that these examples are in no way limitative on the invention.

The cracking sites of each sample that had been cured in this manner were obtained and the degree of self-healing was evaluated. The results are shown in Table 1. The evaluations A-D in Table 1 were based on the following scale.

A: Cracking sites filled rapidly with precipitates, very high chemical stability of precipitates.

B: Cracking sites filled slowly with precipitates, high chemical stability of precipitates.

C: Cracking sites filled with precipitates, but with minimally high chemical stability of precipitates.

D: Precipitates failed to fill cracking sites, no self-healing effect on cracking.

TABLE 1

| Sample | Cement | CSA | Na-Ben | CaO | Talc | $MgCO_3$ | $Li_2CO_3$ | $CaHPO_4$—$2H_2O$ | $Mg(OH)_2$ | Fly ash | Evaluation |
|---|---|---|---|---|---|---|---|---|---|---|---|
| 1 | 100 | — | — | — | — | — | — | — | — | — | D |
| 2 | 90 | 10 | — | — | — | — | — | — | — | — | D |
| 3 | 90 | 5 | 5 | — | — | — | — | — | — | — | C |
| 4 | 90 | 5 | 3 | 2 | — | — | — | — | — | — | B |
| 5 | 90 | — | 5 | — | 5 | — | — | — | — | — | C |
| 6 | 90 | — | — | — | 10 | — | — | — | — | — | D |
| 7 | 90 | 5 | 2 | — | 3 | — | — | — | — | — | C |
| 8 | 90 | 5 | 2 | — | 2 | 1 | — | — | — | — | C-B |
| 9 | 90 | 5 | 2 | — | 2 | — | 1 | — | — | — | B |
| 10 | 90 | 5 | 2 | — | 2 | — | — | 1 | — | — | A |
| 11 | 90 | 5 | 2 | 1 | 1 | — | 1 | — | — | — | B |
| 12 | 90 | 5 | 2 | — | 2 | — | — | — | 1 | — | C-B |
| 13 | 90 | 5 | 2 | 1 | 1 | 1 | — | — | — | — | C |
| 14 | 93 | 5 | 0.5 | — | 0.5 | — | — | 1 | — | — | C-B |
| 15 | 93 | 4.5 | 0.5 | — | 0.5 | — | — | 1 | — | 0.5 | C-B |
| 16 | 93 | 4.5 | 0.4 | — | 0.5 | — | — | 0.5 | — | 1.1 | C |
| 17 | 93 | 5 | 0.4 | — | 0.5 | — | 0.1 | 0.7 | — | 0.3 | B |
| 18 | 90 | 4 | 2 | 1 | 2 | — | 0.1 | 0.6 | — | 0.3 | A |

[Evaluation of Self-Healing Capability in Cement Composition]

(Preparation of Cement Compositions: Sample Nos. 1-18)

The components listed in Table 1 below were combined to prepare cement compositions for Sample Nos. 1-18. The components listed in Table 1 are the following. The numerical value units in the table are the wt % values for each component based on the total cement composition.

OPC: Normal Portland cement

CSA: Calcium sulfoaluminate, DENKA CSA#20

Na-Ben: Na-bentonite, HOJUN (Super clay)

Talc: General-purpose talc (SSS) by Nippon Talc.

Fly ash: Type II fly ash by Jpec Co., Ltd.

(Evaluation)

First, water was mixed with each cement composition of Sample Nos. 1-18 mentioned above to a water ratio (%, based on weight) of 45% with respect to the cement composition, and the cement composition was hardened. When cracking of 0.2-0.3 mm width had formed in each sample after an elapse of 120 days at which hydration of the cement composition was judged to be virtually complete, it was cured again in water.

In Table 1, samples 1, 2 and 6 correspond to comparative examples of the invention since they do not contain the cement admixture of the invention, while the other samples correspond to examples of the invention. As shown in Table 1, the samples of the examples all had the cracking sites occluded by precipitates and progression of self-healing, whereas the samples of the comparative examples did not exhibit progression of self-healing. The samples with evaluation of A, in particular, had occlusion of the cracking sites by precipitates by the 3rd day after the start of curing in water, and the precipitates were found to have color close to that of the original cement.

These results indicated that the cement compositions of the examples provide a satisfactory self-healing capability. The results with these cement compositions suggest that an excellent self-healing capability would be obtained when the cement compositions are applied in concrete as well.

[Evaluation of Self-Healing Capability in Concrete]

(Preparation of Concrete: Sample No. 19)

The components listed in Table 2 below were combined to prepare concrete for Sample No. 19. The numerical values in Table 2 are the contents (kg) of each component per 1 $m^3$ of concrete, and the numerical values in parentheses in the cement composition columns are the content ratios (wt %) of each component in the cement composition. The components in Table 2 are the same ones as listed in Table 1. The water reducing agent SP-III is a high performance water reducing agent with a retardation effect (SIKAMENT 1100NT).

TABLE 2

| | Cement composition | | | | | | | |
|---|---|---|---|---|---|---|---|---|
| Cement | Expanding material | NA-bentonite | Talc | CAHPO$_4$·H$_2$O | Water reducing agent SP-III | Water | Fine aggregate | Coarse aggregate |
| 344.1 (93%) | 18.5 (5%) | 1.85 (0.5%) | 1.85 (0.5%) | 3.7 (1%) | 5.0 (1.35%) | 175 | 809 | 920 |

(Preparation of Concrete: Sample No. 20)

Concrete for Sample No. 20 was prepared in the same manner as Sample No. 19, except that the concrete sample for the comparative example was changed from the cement composition to Sample No. 1.

(Evaluation)

After curing the concrete of the obtained Sample Nos. 19 and 20 for 28 days, 0.1-0.3 mm-width cracking was introduced and they were further cured in water. As a result, no precipitates had formed in the cracking sites of the concrete of Sample No. 20 after introducing cracking, even with curing for 28 days. With the concrete of Sample No. 19, on the other hand, precipitates formed in the cracking sites after introduction of cracking and curing for 3 days, and with 22 days of curing, even 0.22 mm-width cracking sites were confirmed to be completed occluded.

[Evaluation of Self-Sealing Capability in Concrete]

(Preparation of Concrete: Sample Nos. 21-23)

The components listed in Table 3 below were combined to prepare concrete for Sample Nos. 21-23.

a sealed state. The expanded concrete was externally constrained during hardening using a PC steel rod.

Next, cracking was introduced into each evaluation sample at the concrete sections, at a material age of 7 days. The cracking was formed by subjecting the evaluation sample to tensile force. The crack widths at the concrete section of each evaluation sample were fixed at 0.1 mm, 0.2 mm and 0.4 mm.

After fixing the cracking, water was continuously flowed into the cracking sites and the cracking healing property was observed. A 1 m head of water was provided. The hydraulic grade on the evaluation sample was 10 m/m. For the evaluation, (1) the self-sealing capability obtained by measuring the water permeation in a constant water-permeated state was evaluated, and (2) the cracking sites were observed with a microscope in a constant water-permeated state, and the degree of reduction in the crack width was evaluated. The obtained evaluation results are shown in Table 4. The evaluations in Table 4 were based on the following scale.

(1) Evaluation of Self-Sealing Capability

A: Amount of water permeation at 7 days was 1/50 of the initial water permeation.

TABLE 3

| | | Cement composition | | | | | | | | | Water | | | |
|---|---|---|---|---|---|---|---|---|---|---|---|---|---|---|
| | | Cement admixture | | | | | | | | | | | | |
| Sample | Cement | Expanding material | Na-bentonite | Talc | CaO | Li$_2$CO$_3$ | CaHPO$_4$·2H$_2$O | Fly ash | Z1 | High-performance AE water reducing agent | Water | powder ratio (%) | Fine aggregate | Coarse aggregate |
| 21 | N: 370 | 0 | 0 | 0 | 0 | 0 | 0 | 0 | 0 | 1.48 | 175 | 47 | 809 | 920 |
| 22 | L: 328 | 50 | 0 | 0 | 0 | 0 | 0 | 0 | 4 | 1.51 | 170 | 45 | 839 | 950 |
| 23 | N: 333 (90%) | 14.8 (4%) | 7.4 (2%) | 7.4 (2%) | 3.7 (1%) | 0.37 (0.1%) | 2.22 (0.6%) | 1.11 (0.3%) | 0 | 7.4 (2%) | 175 | 47 | 809 | 920 |

The units of the numerical values shown in Table 3 are all kg/m$^3$, except for those whose units are denoted in the table. In Table 3, N and L listed in the cement column indicate the type of cement and are the following. The other components listed in the table are also explained below.

N: Normal Portland cement (density=3.15 g/cm$^3$)
L: Low-heat Portland cement (density=3.24 g/cm$^3$)
Expanding material: Ettringite-based (density=3.12 g/cm$^3$, area-to-weight ratio: 3000 cm$^2$/g)
Z1: Inorganic cement crystal growth promoter
Fine aggregate: Sand from Hougi, Kimitsu-shi, Chiba Prefecture (density=2.65 g/cm$^3$)
Coarse aggregate: Crushed stone from Ryoukamimura, Chichibu, Saitama Prefecture (density=2.66 g/cm$^3$)
High performance AE water reducing agent: Polycarboxylic acid-based (Evaluation)

First, each concrete sample was cured as described below to obtain evaluation samples. Each evaluation sample was concrete formed into a 10 cm×10 cm×40 cm rectangular solid form. The concrete was stored to a material age of 7 days, in B: Water permeation at 7 days was more than 1/50 and no more than 1/10 of the initial water permeation.
C: Water permeation at 7 days was more than 1/10 and no more than 1/2 of the initial water permeation.
D: Amount of water permeation at 7 days could not be kept below 1/2 of the initial water pet ineation.

(2) Evaluation of Crack Width

A: Crack width at 28 days reduced by 0.1 mm or more.
B: Reduction in crack width at 28 days was 0.05 mm or more and less than 0.1 mm.
C: Reduction in crack width at 28 days was 0.025 mm or more and less than 0.5 mm.
D: Reduction in crack width at 28 days was less than 0.025 mm.

TABLE 4

| Sample | Self-sealing capability | Crack width |
|---|---|---|
| 21 | C | D |
| 22 | C | C-B |
| 23 | A | A |

In Table 4, Sample No. 23 corresponds to an example of the invention, and Sample Nos. 21 and 22 correspond to comparative examples, since they did not contain a composition of the invention. The results shown in Table 3 confirm that the example Sample No. 23 had an excellent self-sealing capability, a high degree of reduction in crack width and an excellent self-healing capability, compared to the comparative example Sample Nos. 21 and 22.

The invention claimed is:

1. A cement admixture comprising:
   an expanding material;
   an alumina-silicate with swelling properties;
   a magnesium silicate; and
   a calcium phosphate.

2. A cement admixture according to claim 1, which further contains a water reducing agent.

3. A cement composition containing cement and a cement admixture according to claim 1.

4. Concrete containing a cement composition according to claim 3, water, and an aggregate.

5. A cement composition containing cement and a cement admixture according to claim 2.

6. The cement admixture of claim 1, wherein the alumina-silicate with swelling properties comprises bentonite.

* * * * *